United States Patent [19]

Müller

[11] 4,110,089
[45] Aug. 29, 1978

[54] APPARATUS WITH FOAM BREAKER

[76] Inventor: Hans Müller, Erlenbach, Switzerland

[21] Appl. No.: 754,093

[22] Filed: Dec. 23, 1976

Related U.S. Application Data

[63] Continuation of Ser. No. 573,527, May 1, 1975, abandoned.

[30] Foreign Application Priority Data

May 13, 1974 [CH] Switzerland .......................... 6530/74

[51] Int. Cl.$^2$ .............................................. B01D 19/02
[52] U.S. Cl. ......................................... 55/178; 55/199
[58] Field of Search .......................... 55/87, 178, 199; 159/DIG. 5; 259/8, 96; 366/263

[56] References Cited

U.S. PATENT DOCUMENTS

| | | | |
|---|---|---|---|
| 1,847,648 | 3/1932 | Harkom ................................. | 55/178 |
| 1,967,938 | 7/1934 | Jantzen et al. ......................... | 55/178 |
| 3,567,400 | 3/1971 | Shah .................................... | 55/178 UX |
| 3,577,868 | 5/1971 | Müller ................................... | 55/178 |
| 3,815,331 | 6/1974 | Hondermark .......................... | 55/178 |

*Primary Examiner*—Charles N. Hart
*Assistant Examiner*—Richard W. Burks
*Attorney, Agent, or Firm*—Michael J. Striker

[57] ABSTRACT

Foam is generated in a vessel as a result of the mixing of gaseous and liquid phases in the vessel. A foam breaker has a housing which straddles and is open to an upper opening of the vessel. A vertical shaft is mounted in the housing for rotation by an upper and a lower bearing; the shaft carries conical foam breaking members and the housing has an outlet through which the gaseous component of the broken-up foam can escape.

6 Claims, 1 Drawing Figure

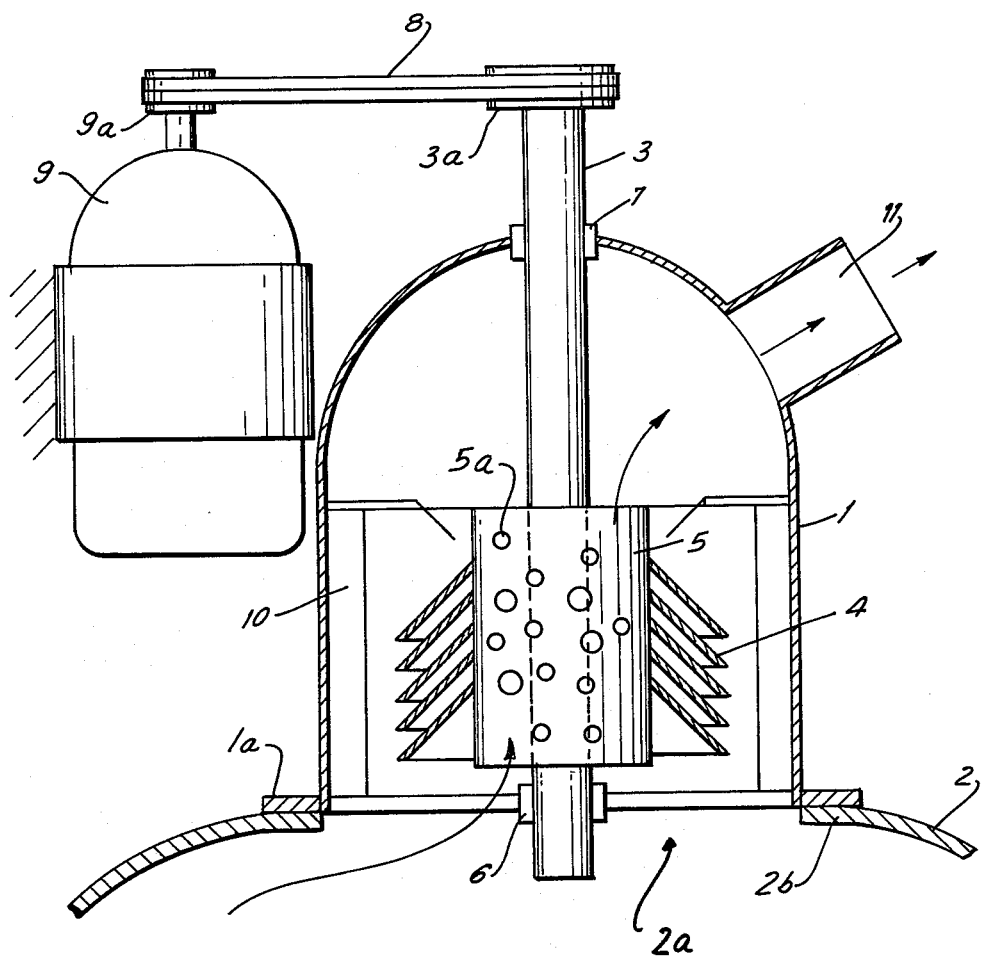

APPARATUS WITH FOAM BREAKER

This is a continuation of application Ser. No. 573,527, filed May 1, 1975, and now abandoned.

BACKGROUND OF THE INVENTION

This application is directed to an apparatus wherein foam is generated as a result of the operation of the apparatus, and which is provided with an improved foam breaking arrangement.

The invention is particularly useful in the continuous, foam-free discharge of gaseous reaction products from fermenters, i.e., from vessels wherein micro-biological reactions take place which generate such gaseous reaction products.

Equipment of this type, provided with foam breaking arrangements, is already known in the art, e.g., from U.S. Pat. Nos. 3,693,325 and 3,501,414. In these basically satisfactory constructions of the prior art the foam breakers are located in the reactor vessel itself. This means that when certain dimensions of the reactor vessel and foam breaking arrangement are exceeded, it is difficult to satisfactorily journal the rotary shaft of the arrangement, in such a manner as to prevent it from performing "whipping" motions and undergoing excessive vibrations during its rotation.

SUMMARY OF THE INVENTION

It is therefore an object of this invention to further improve foam breaking arrangements in apparatus of the type outlined above.

More particularly, it is an object of this invention to provide such an apparatus where the aforementioned problems are overcome and do not impose any limitations on the size of the apparatus and/or its output capability per unit time.

Another object is to provide a foam breaker arrangement which is simple and which can be used with differently sized reactor vessels.

In keeping with these objects, and with others which will become apparent hereafter, a feature of the invention resides in an apparatus in which mixing of gaseous and liquid phases results in the formation of foam. Briefly stated, the apparatus comprises
 a. a vessel in which the foam is formed, said vessel having an opening; and
 b. foam-breaking means for breaking up the foam into its constituent liquid and gaseous components, comprising a housing straddling said opening and communicating through the same with said vessel, a shaft extending in the interior of said housing, foam breakers carried by said shaft within said housing, bearings journalling said shaft at axially spaced locations for rotation about the longitudinal axis of said shaft, and a drive for rotating said shaft about said axis.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

The single FIGURE is a fragmentary vertical section through an exemplary embodiment of the invention.

DESCRIPTION OF THE PREFERRED EMBODIMENTS

Reference numeral 2 identifies an upright fermenter or, generally, reactor vessel of the type disclosed in the aforementioned U.S. patents. Of course, the vessel 2 could also have a more or less horizontal orientation, if desired. It will, in any case, have an opening 2a which may be bounded by a flange 2b.

According to the invention, the foam breaking arrangement has a housing 1 which is mounted on the vessel, e.g., by means of flange 1a that cooperates with flange 2b. These flanges may be bolted or otherwise secured together, as known in the art.

Mounted in the upright housing 1 is an upright shaft 3 which is journalled for rotation in an upper anti-friction bearing 7 and a lower anti-friction bearing 6. In the illustrated embodiment the upper bearing 7 is mounted on housing 1, whereas lower bearing 6 is carried by vessel 2. However, both bearings could be carried by housing 1, if desired.

A lower part of shaft is constructed as a hollow shaft section 5 which is provided in its circumferential wall with openings or perforations 5'. For this purpose, the solid shaft may be surrounded with clearance by a perforated sleeve which is mounted on it by means of supporting struts or the like. The upper part of shaft 3 extends out of the housing 1 and carries a belt pulley 3a. An electric motor 9 is stationarily mounted adjacent the housing 1 (it might even be mounted on the same) and has an output shaft which also carries a belt pulley 9a. A drive belt is trained around the pulleys 9a, 3a and rotates shaft 3 when motor 9 is energized. The shaft section 5 has mounted on it upwardly convergent annular foam-breaking members 4 which are so arranged that they axially overlap one another. The members 4 rotate with shaft 3, 5.

Mounted on the inside of housing 1, extending over the entire axial height of the members 4 but outwardly spaced from them, are stationary baffles 10, also known as "chicanes". They prevent a smooth circulation of foam, causing turbulence which forces the foam to enter between the members 4 and to become separated into its constituent liquid and gaseous components, in the manner disclosed in the aforementioned U.S. patents.

In operation, dense foam develops in vessel 2 due to the mixing of air (which is blown into the vessel 2 in known manner) with the fermentation liquid (e.g., nutrient medium) and the reaction gases which are metabolically generated by the growing micro-organisms. This foam must be separated into its liquid component that is to be retained in the vessel 2, and its gaseous component (air and reaction products) which are to be vented from vessel 2. The foam rises through opening 2a into housing 1 and is separated into its constituent components by the rotating members 4. The liquid component is flung against the baffles 10 and runs back into the vessel 2, whereas the gaseous component escapes through the openings 5' into the interior of the section 5 and travels upwardly therein to escape through the outlet 11 which is provided in the housing 1 for this purpose.

It will be understood that each of the elements described above, or two or more together, may also find a useful application in other types of constructions differing from the types described above.

While the invention has been illustrated and described as embodied in a foam-breaker, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. In an apparatus in which mixing of gaseous and liquid phases results in the formation of foam, a combination comprising a vessel in which the foam is formed, said vessel having an opening and an inlet and outlet; foam-breaking means for breaking up the foam into its constituent liquid and gaseous components, comprising an upright housing straddling said opening and communicating through the same with said vessel, said housing being dome-shaped and having an upper domed part and a lower cylindrical part, rotatable foam breakers located within said cylindrical part of said housing and having an upright axis of rotation, said foam breakers being upwardly convergent coaxial members axially spaced from and axially overlapping one another, and stationary vertical baffles mounted in said cylindrical part of said housing and having longitudinal edges facing toward but spaced from said members parallel thereto, said baffles being integral plates extending over the entire length of said members and outwardly surrounding and adjacent the same so that the foam entering said lower cylindrical part of said housing from said vessel and through said opening in an upward direction is prevented from smooth circulation further in said direction and into said domed part of said housing, and is forced to contact said foam breakers which separate the liquid phase of the foam from the gaseous phase thereof, and the liquid phase is flung against said baffles to thereafter run back in an opposite direction downwardly into said vessel through said opening whereas the gaseous phase of the foam is evacuated out of said housing; and means for rotating said foam breakers about said axis including a shaft extending in the interior of the housing and carrying said foam breakers, said shaft having at least a portion which is hollow and perforated, bearings journalling said shaft at axially spaced locations, and drive means for rotating said shaft about said axis.

2. A combination as defined in claim 1, wherein said housing and shaft have an upright orientation, and wherein said bearings comprise an upper bearing and a lower bearing.

3. A combination as defined in claim 2, wherein said lower bearing is carried by said vessel.

4. A combination as defined in claim 2, wherein said upper bearing is carried by said housing.

5. A combination as defined in claim 4, said housing having an upper end, and said upper bearing being mounted at said upper end.

6. A combination as defined in claim 1, wherein said foam breakers are annular members mounted on and surrounding said shaft.

* * * * *